US011489753B2

(12) United States Patent
Horrein et al.

(10) Patent No.: US 11,489,753 B2
(45) Date of Patent: Nov. 1, 2022

(54) METHOD AND SYSTEM FOR CLASSIFYING DATA PACKET FIELDS ON FPGA

(71) Applicant: OVH, Roubaix (FR)

(72) Inventors: Pierre-Henri Horrein, Nieppe (FR); Tristan Groleat, Brest (FR)

(73) Assignee: OVH, Roubaix (FR)

( * ) Notice: Subject to any disclaimer, the term of this patent is extended or adjusted under 35 U.S.C. 154(b) by 103 days.

(21) Appl. No.: 17/105,996

(22) Filed: Nov. 27, 2020

(65) Prior Publication Data

US 2021/0168062 A1  Jun. 3, 2021

(30) Foreign Application Priority Data

Nov. 29, 2019  (EP) .................................... 19315152

(51) Int. Cl.
*H04L 45/02* (2022.01)
*G06N 5/02* (2006.01)
*H04L 49/1546* (2022.01)

(52) U.S. Cl.
CPC .............. *H04L 45/02* (2013.01); *G06N 5/02* (2013.01); *H04L 49/1546* (2013.01)

(58) Field of Classification Search
None
See application file for complete search history.

(56) References Cited

U.S. PATENT DOCUMENTS

2015/0117450 A1* 4/2015 Thibaut .................. H04L 45/48 370/392
2016/0071016 A1* 3/2016 Goyal ....................... G06N 5/02 706/47
2017/0222937 A1* 8/2017 Lin ........................ H04L 45/745

OTHER PUBLICATIONS

Lakshman et al., "High-speed policy-based packet forwarding using efficient multi-dimensional range matching", In Proc.ACM Sigcomm'98, 1998, pp. 203-214.
Baboescu et al., "Scalable Packet Classification", In Proceedings of ACM SIGCOMM '01, 2001, USA, 12 pages.
Li et al., "Scalable Packet Classification Using Bit Vector Aggregating and Folding", MIT LCS Technical Memo: MIT-LCS-TM-637, 2003, pp. 1-9.
Rock Qu et al., "Fast dynamically updatable packet classifier on FPGA", 23rd International Conference on Field programmable Logic and Applications FPL 2013, 4 pages.
Singh et al., "Packet Classification Using Multidimensional Cutting", SIGCOMM'03, 2003, Germany, 12 pages.
Kennedy, "PhD Thesis: Energy Efficient Hardware Accelerators for Packet Classification and String Matching", DCU, 2010, 196 pages.
Vamanan et al., "EffiCuts: Optimizing Packet Classification for Memory and Throughput", CCR, 2010, pp. 207-218.

(Continued)

*Primary Examiner* — Robert M Morlan
(74) *Attorney, Agent, or Firm* — BCF LLP (57) ABSTRACT

A method and system for classifying data packet fields are disclosed. They associate a final tag to each of the fields in a data packet in relation to a set of classifying rules, and involve building a decision tree using a recursive algorithm to apply the set of classifying rules on the data packet fields, mapping each node of the built decision tree respectively to a processing element of a FPGA, each processing element comprising a processor and a memory, pipelining all mapped processing elements, and processing the data packet fields through the pipelined and mapped processing elements.

15 Claims, 8 Drawing Sheets

(56) References Cited

OTHER PUBLICATIONS

Yang et al., "Practical Multituple Packet Classification Using Dynamic Discrete Bit Selection", IEEE Transactions on Computers, vol. 63, No. 2, 2014, pp. 424-434.
Fiessler et al., "HyPaFilter+: Enhanced Hybrid Packet Filtering Using Hardware Assisted Classification and Header Space Analysis", Journal of Latex Class Files, vol. 14, No. 8, 2015, pp. 1-14.
Cornevaux-Juignet, "Hardware and software co-design toward flexible terabits per second traffic processing", HAL Archives-Ouvertes. fr, Hardware and software co-design toward flexible terabits per second traffic processing. Electronics. Ecole nationale supérieure Mines-Télécom Atlantique, 2018, 151 pages.
Pallavi et al., "Design of a High Speed FPGA-Based Classifier for Efficient Packet Classification", International Journal of Computer Trends and Technology, vol. 9, No. 3, 2014, pp. 123-128.
Jiang et al., "Scalable Packet Classification on FPGA", IEEE Transactions on Very Large Scale Integration (VLSI) Systems, vol. 20, No. 9, 2012, pp. 1668-1680.
Extended European Search Report with regard to the European Patent Application No. EP 19315152.9 completed May 19, 2020.
Zhou et al., "Large-scale Packet Classification on FPGA", IEEE, ASAP, 2015, pp. 226-233.
Wicaksana et al., "Fast and Reconfigurable Packet Classification Engine in FPGA-Based Firewall", 2011 International Conference on Electrical Engineering and Informatics, 2011, Bandung, Indonesia, pdf 7 pages.
Becker et al., "PTREE: A System for Flexible, Efficient Packet Classification: Hardware Implementation", CS535, 2001, pp. 1-35.

\* cited by examiner

METHOD AND SYSTEM FOR CLASSIFYING DATA PACKET FIELDS ON FPGA

CROSS-REFERENCE

The present application claims priority from European Patent Application No. 19315152.9, filed on Nov. 29, 2019, the disclosure of which is incorporated by reference herein in its entirety.

FIELD

The present technology relates to, and the disclosed packet classification method and system enable screening data packets received at a networking piece of equipment.

BACKGROUND

Networking pieces of equipment, such as for example those populating data centers and cloud infrastructure that integrate many servers and provide mutualized hosting services to large numbers of clients, may be critically involved in the classification of data packets that go through their ports. For example without limitation, one application may be to filter out data packets that are intended to maliciously attack the security and integrity of such data centers and cloud infrastructure.

Examples of such networking pieces of equipment include firewalls, switches, routers, and other dedicated security risk mitigation pieces of equipment. Firewalls for example may be used to block some of the traffic incoming into a service infrastructure. They may be viewed as simplified classifiers that can apply a set of rules to associate received data packets to classes. The rules represent certain predefined binary patterns that are sought in certain fields of data packet frames. The classes represent certain actions taken by the classifier with the data packet when the predefined binary patterns are matched in the data packet. A firewall may for example apply rules that involve the content of the header of a data packet, including a source IP address, a destination IP address, a protocol indicator, (e.g. designating TCP or UDP), a source port, and a destination port. A firewall is a simplified classifier notably because the only two classes in this case are "drop" and "pass-through" in relation to the data packet.

More generally, classifiers will apply any number of rules, to any parts of a data packet, leading to any number of classes. Also, classes may be more complex with associated parameters, such as the size of a class, such as in the case of a data packet traffic that is "passed-through" up to a certain number of packets, then "dropped" once a given count threshold is reached.

With the increase in complexity of packet processing, comes the problem of throughput of the classifier. This problem is partially addressed by the common use of Field Programmable Gate Array (FPGA) technology, as hardware based environment of choice for the implementation of the classifier. It is in indeed important that the data packet classifying activity does not slow down traffic through the networking piece of equipment.

Classifiers based on FPGAs have been devised, that have been affected by one or more of the following drawbacks:
they handle a limited number of rules;
their throughput is still not up to par with the speed of the link incoming the networking equipment;
they handle classes that are limited in number and/or size; and
they handle a single binary pattern per data packet frame field.

Therefore, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art. In particular, such shortcomings may comprise:
slow and inefficient classifying of data packets;
non adaptability to changes in size and location in the data packet, of data frames used for classification;
non adaptability to fast changes in rules to be applied on a traffic to be classified;
non adaptability to an increasing set of rules to be applied;
non adaptability to fast changes in classes in which data packets are classified;
non adaptability to an increasing set of such classes; and/or
necessity of costly or slow additional memory chips on top of the FPGA.

In one embodiment, various implementations of the present technology provide a method for classifying data packet fields by associating a final tag to each of the fields in a data packet in relation to a set of classifying rules, the method comprising:
building a decision tree to apply the set of classifying rules on the data packet fields;
mapping each node of the built decision tree respectively to a processing element of a FPGA, each processing element comprising a processor and a memory;
pipelining all mapped processing elements so that each mapped processing element, but the first and last processing element in the pipeline, as current processing element:
  receives as inputs, values: for the data packet fields, for a state of processing the data packet fields by the preceding processing elements in the pipeline, for tags associated with the data packet fields by the preceding processing elements in the pipeline, and for an address in the memory where the processor of the current processing element may fetch instructions to execute; and
  outputs values: for the data packet fields, for a state of processing the data packet fields by the preceding and current processing elements in the pipeline, for tags associated with the data packet fields by the preceding and current processing elements in the pipeline, and for an address in the memory where the processor of the next processing element in the pipeline may fetch instructions to execute;
processing the data packet fields through the pipelined and mapped processing elements by:
  inputting in the first processing element in the pipeline values: for the data packet fields and for an address in the memory where the processor of the first processing element in the pipeline may fetch instructions to execute; and
  outputting by the last processing element in the pipeline values for the final tag associated with each of the data packet fields by the preceding and last processing elements in the pipeline.

In one embodiment of the method, the building a decision tree comprises introducing buffer states if the size of a data packet field to be matched with a classifying rule is larger than the size of the memory.

In another embodiment of the method, the building a decision tree comprises storing tags in the decision tree.

In yet another embodiment, various implementations of the present technology provide a system for classifying a first data packet comprising at least one field by associating a final tag to a first data packet field in relation to a first set of classifying rules, the system comprising pipelined processing elements on a FPGA, with each processing element comprising a processor and a memory, wherein the pipelined processing elements are each mapped respectively to a node of a first decision tree built to apply the first set of classifying rules on the first data packet field, and wherein each of the pipelined processing elements but the first and last processing elements in the pipeline, as current processing element:

receives as inputs, values: for the first data packet field, for a state of processing the first data packet field by the preceding processing elements in the pipeline, for tags associated with the first data packet field by the preceding processing elements in the pipeline, and for an address in the memory where the processor of the current processing element may fetch instructions to execute; and outputs values: for the first data packet field, for a state of processing the first data packet field by the preceding and current processing elements in the pipeline, for tags associated with the first data packet field by the preceding and current processing elements in the pipeline, and for an address in the memory where the processor of the next processing element in the pipeline may fetch instructions to execute;

and wherein the first processing element in the pipeline is configured to receive values: for the first data packet field and for an address in the memory where the processor of the first processing element in the pipeline may fetch instructions to execute;

and wherein the last processing element in the pipeline is configured to output values for the final tag associated with the first data packet field by the preceding and last processing elements in the pipeline.

In an embodiment of the system, pipelined processing elements on the FPGA but the first element in the pipeline, comprise at least two processors and a memory shared between the at least two processors, wherein one of the at least two processors is mapped to a node of a second decision tree built concurrent with the first decision tree to apply the first set of classifying rules on the first data packet field.

In another embodiment of the system, pipelined processing elements on the FPGA but the first element in the pipeline, comprise at least two processors and a memory shared between the at least two processors, wherein one of the at least two processors is mapped to a node of a second decision tree built to apply the first set of classifying rules or a second set of classifying rules on a second data packet.

In yet another embodiment of the system, the instructions to be executed by a processing element allow the processing element to perform at least one of the operations of:
comparing with a reference value;
updating the tags associated with each of the data packet fields;
ending processing;
duplicating the processing of data packet fields so as to process them through two or more decision trees; or
merging the processing of data packet fields at the end of two or more decision trees.

In yet another embodiment of the system, the instructions to be executed by a processing element allow the processing element to perform including the operation of parallel processing over two or more processors for instructions with operands that are larger than the memory capacity.

In one embodiment, various implementations of the present technology provide a method of building a first decision tree for classifying data packet fields by associating a final tag to each of the fields in a data packet in relation to a set of classifying rules, in a computing environment comprising:

processing elements of a FPGA, each processing element comprising a processor and a memory;
the processing elements being pipelined so that each processing element, but the first and last processing element in the pipeline, as current processing element:
  receives as inputs, values: for the data packet fields, for a state of processing the data packet fields by the preceding processing elements in the pipeline, for current tags associated with the data packet fields by the preceding processing elements in the pipeline, and for an address in the memory where the processor of the current processing element may fetch instructions to execute; and
  outputs values: for the data packet fields, for a state of processing the data packet fields by the preceding and current processing elements in the pipeline, for current tags associated with the data packet fields by the preceding and current processing elements in the pipeline, and for an address in the memory where the processor of the next processing element in the pipeline may fetch instructions to execute; and
the associating a final tag comprising:
  inputting in the first processing element in the pipeline values: for the data packet fields and for an address in the memory where the processor of the first processing element in the pipeline may fetch instructions to execute; and
  outputting by the last processing element in the pipeline values for the final tag associated with each of the data packet fields by the preceding and last processing elements in the pipeline;
wherein the instructions allow the processing elements to perform one of:
  comparing data packet fields with a reference value;
  updating the current tags associated with the data packet fields;
  duplicating the processing of data packet fields so as to process them through at least one second decision tree;
  merging the processing of data packet fields that have been processed through the at least second decision tree; or
  ending the comparing, updating, duplicating or merging;
wherein the first decision tree is being recursively built by:
  creating a tree node for the set of classifying rules, the tree node being either a decision node to branch to children in the first decision tree, or a labelling node that associates current tags to the data packet fields;
  mapping the created tree node to a processing element;
  marking the created node as matching node if one of the classifying rules in the set is matched; and
  repeating the creating, mapping and marking for all classifying rules in the set until the set is empty.

In one embodiment, the method further comprises introducing buffer states if the size of a data packet field to be matched with a classifying rule is larger than the size of the memory.

In one embodiment, the method further comprises storing the current and final tags in the decision tree.

In yet another embodiment, various implementations of the present technology provide a system for classifying first data packet fields by associating a final tag to each of the fields in a data packet in relation to a set of classifying rules, the system comprising pipelined processing elements on a FPGA, with each processing element comprising a processor and a memory, and a computing system configured to build a first decision tree, wherein the processing elements are pipelined so that each of the pipelined processing elements but the first and last processing elements in the pipeline, as current processing element:

receives as inputs, values: for the first data packet fields, for a state of processing the first data packet fields by the preceding processing elements in the pipeline, for current tags associated with the first data packet fields by the preceding processing elements in the pipeline, and for an address in the memory where the processor of the current processing element may fetch instructions to execute; and outputs values: for the first data packet fields, for a state of processing the first data packet fields by the preceding and current processing elements in the pipeline, for current tags associated with the first data packet fields by the preceding and current processing elements in the pipeline, and for an address in the memory where the processor of the next processing element in the pipeline may fetch instructions to execute;

and wherein the associating a final tag comprises:

the first processing element in the pipeline being configured to receive values: for the first data packet fields and for an address in the memory where the processor of the first processing element in the pipeline may fetch instructions to execute; and the last processing element in the pipeline being configured to output values for the final tag associated with the first data packet fields by the preceding and last processing elements in the pipeline;

wherein:

the instructions allow the processing elements to perform one of:

comparing the first data packet fields with a reference value;

updating the current tags associated with the first data packet fields;

duplicating the processing of the first data packet fields so as to process them through at least one second decision tree;

merging the processing of the first data packet fields that have been processed through the at least one second decision tree; or ending the comparing, updating, duplicating or merging; and the computing system is configured to build the first decision tree recursively by:

creating a tree node for the set of classifying rules, the tree node being either a decision node to branch to children in the first decision tree, or a labelling node that associates current tags or a final tag to the first data packet fields;

mapping the created tree node to a processing element;

marking the created node as matching node if one of the classifying rules in the set is matched; and repeating the creating, mapping and marking for all classifying rules in the set until the set is empty.

In an embodiment of the system, pipelined processing elements on the FPGA but the first element in the pipeline, comprise at least two processors and a memory shared between the at least two processors, wherein one of the at least two processors is mapped to a node of a second decision tree built concurrent with the first decision tree to apply the set of classifying rules on the first data packet fields.

In another embodiment of the system, pipelined processing elements on the FPGA but the first element in the pipeline, comprise at least two processors and a memory shared between the at least two processors, wherein one of the at least two processors is mapped to a node of a second decision tree built to apply the set of classifying rules or a second set of classifying rules on second data packet fields.

In yet another embodiment of the system, the instructions to be executed by a processing element allow the processing element to perform including the operation of parallel processing over two or more processors for instructions with operands that are larger than the memory capacity.

In the context of the present description, unless expressly provided otherwise, a computing system, may refer, but is not limited to, an "electronic device", an "operation system", a "system", a "computer-based system", a "controller unit", a "monitoring device", a "control device" and/or any combination thereof appropriate to the relevant task at hand.

In the context of the present specification, the expression "FPGA" is intended to include Field Programmable Gate Array computing systems, available on the market at the time of filing this patent application, such as references Xilinx VU9P, or Intel Stratix V, and any subsequent equivalent technologies becoming available, regardless of their name, consisting in computing system hardware programmable with software.

In the context of the present description, the functional steps shown in the figures, may be provided through the use of dedicated hardware, as well as hardware capable of executing software in association with appropriate software.

In the context of the present description, the expression "processor" in intended to include a single dedicated processor, a single shared processor, or a plurality of individual processors, some of which may be shared, that are all implemented in a FPGA unless otherwise mentioned. In some aspects of the present technology, the processor may be a general purpose processor, such as a central processing unit (CPU) or a processor dedicated to a specific purpose. Other hardware, conventional and/or custom, may also be included.

In the context of the present description, unless expressly provided otherwise, the expression "memory" is intended to include Random Access computing systems, available on the market at the time of filing this patent application, and any subsequent equivalent technologies becoming available, regardless of their name, consisting in computing system media for storing digital information.

Still in the context of the present description, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present description, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale. Further, elements that are identical from one figure to the next share the same reference numerals.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor (not necessarily in a FPGA), whether or not such computer or processor is explicitly shown.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In an aspect of the present technology, a complex decision tree is built, which is deployed on a FPGA with a given architecture of processing elements (PEs), allowing a classifier to efficiently handle fields from data packets.

Processing Elements

Figure 1:
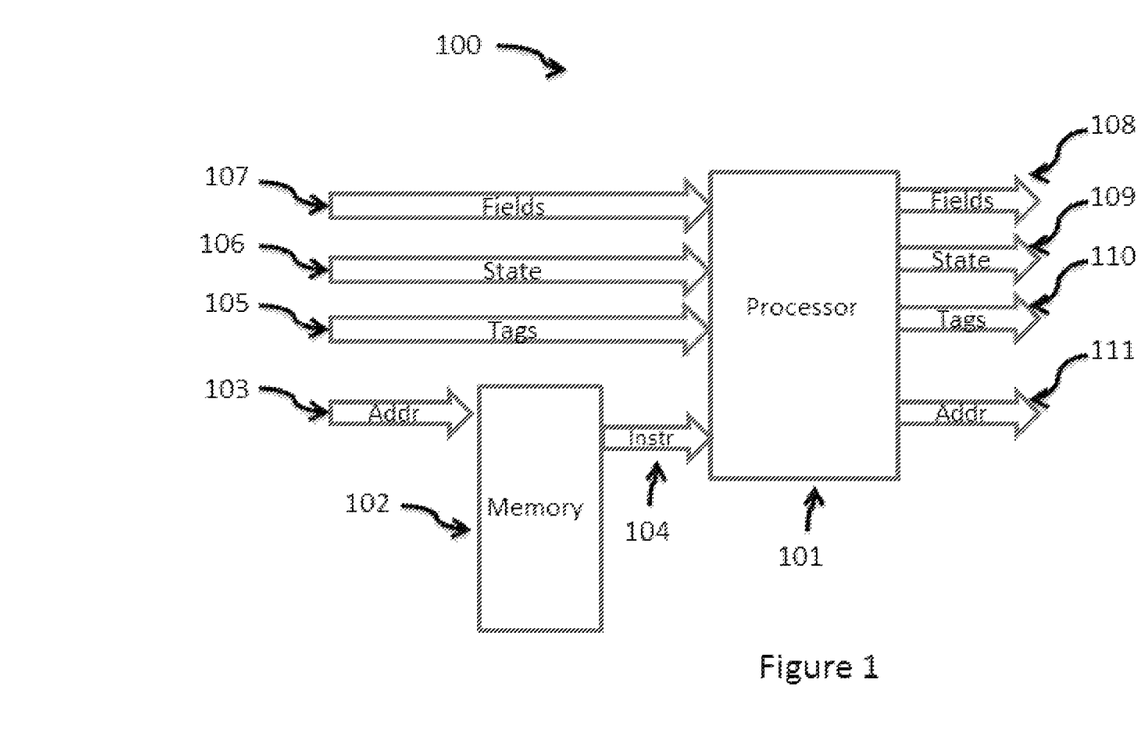
FIG. 1 depicts a processing element that may be used as part of the technology disclosed herein.

The architecture in the FPGA is based on a plurality of Processing Elements (PEs) as specialized and configurable processors. FIG. 1 depicts a PE 100 that may be used as part of the technology disclosed herein. PE 100 comprises a Processor 101 and a Memory 102. Memory 102 receives an Address 103 at which is stored an Instruction 104 that Processor 101 may read and execute. Processor 101 may further receive inputs such as Fields 107 (all fields in a data packet to be classified), Tags 105 (several tags may be associated with each data packet), and a State 106. Based upon instruction 104, Processor 101 may process these inputs, and output Fields 108, a State 109, Tags 110, and an Address 111, that may constitute inputs for another PE. For example:

State 109 may be an indication of what bits in the Fields 108 are already processed, and what tags in the Tags 110 are currently associated with the Fields 108 of the data packet to be classified;

Address 111 may be an indication of where in memory an instruction may be found for a next PE, if any.

Instructions 104 to Processor 101 may for example be words with 3 fields: Code of operation, Operand, and Next PE instruction address. The information included in such Instructions allows to perform the following operations:

compare (equals, smaller than, higher than) with a reference value. The comparison may be performed on selected bits of Fields only;

update the Tags of Fields for a given class;

end processing (no more possible match);

duplicate the processing of Fields so as to process them through two or more decision trees; merge the processing of Fields at the end of two or more decision trees;

parralel process over two or more Processors for Instructions with operands that are larger than the Memory capacity. These are examples of operations, and other contents for Instructions may be had without departing from the scope of the present technology.

Figure 2:
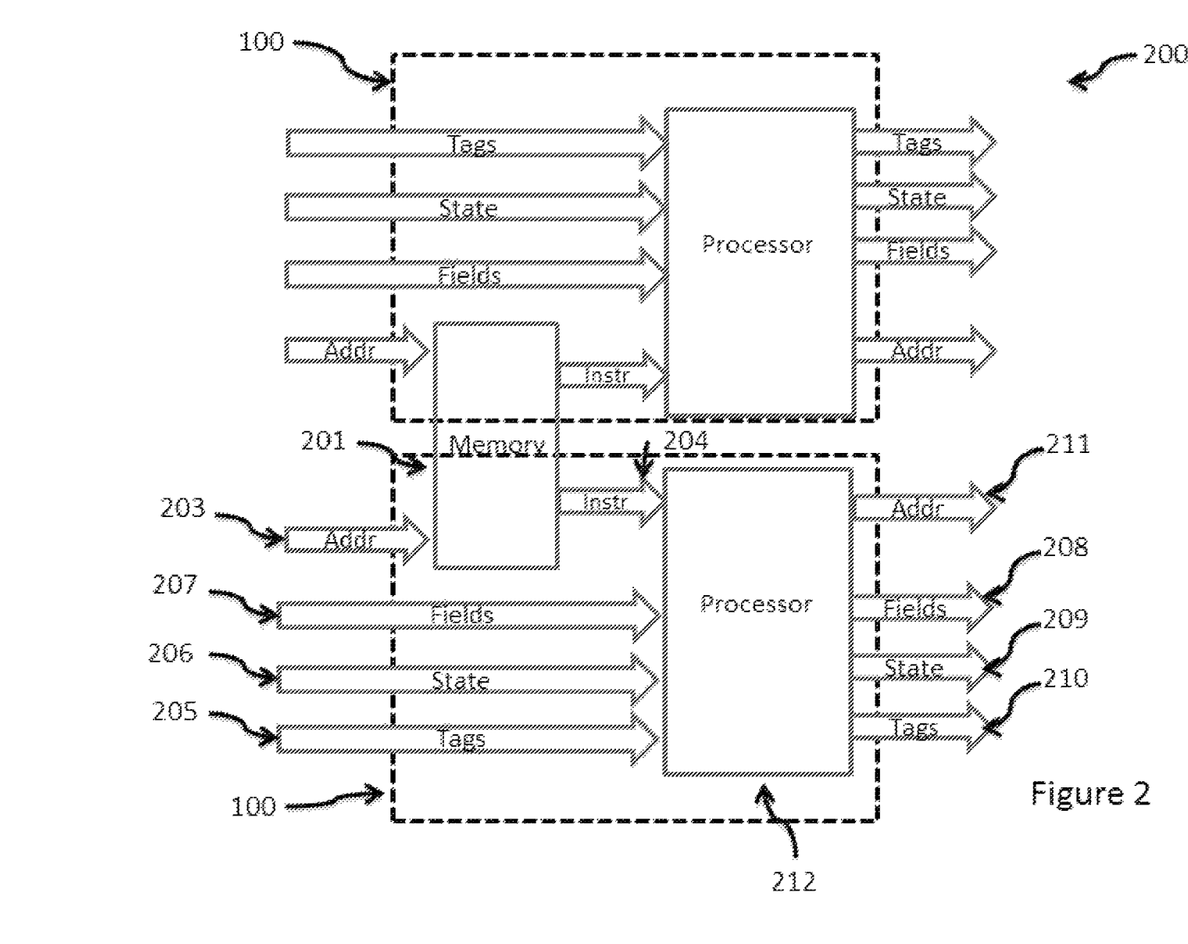
FIG. 2 depicts 2 grouped processing elements that may be used as part of the technology disclosed herein.

Developers of the present technology have advantageously grouped 2 PEs 100 as shown FIG. 2. A Processor Group 200 is thus created, in which the two PE 100 share a Memory 201. The two PE 100 run in parallel, so that in addition to inputs and outputs already described in relation to FIG. 1, parallel inputs and outputs are added to the Processor Group 200 as follows. Memory 201 receives an Address 203 at which is stored an Instruction 204 that a Processor 212 may read and execute. Processor 212 may further receive inputs such as Fields 207, Tags 205, and a State 206. Based upon instruction 204, Processor 212 may process these inputs, and output Fields 208, a State 209, Tags 210, and an Address 111, that may constitute inputs for another PE. While 2 grouped PEs 100 are shown on FIG. 2, more than 2 could also be grouped within the scope of the present technology.

Figure 3:
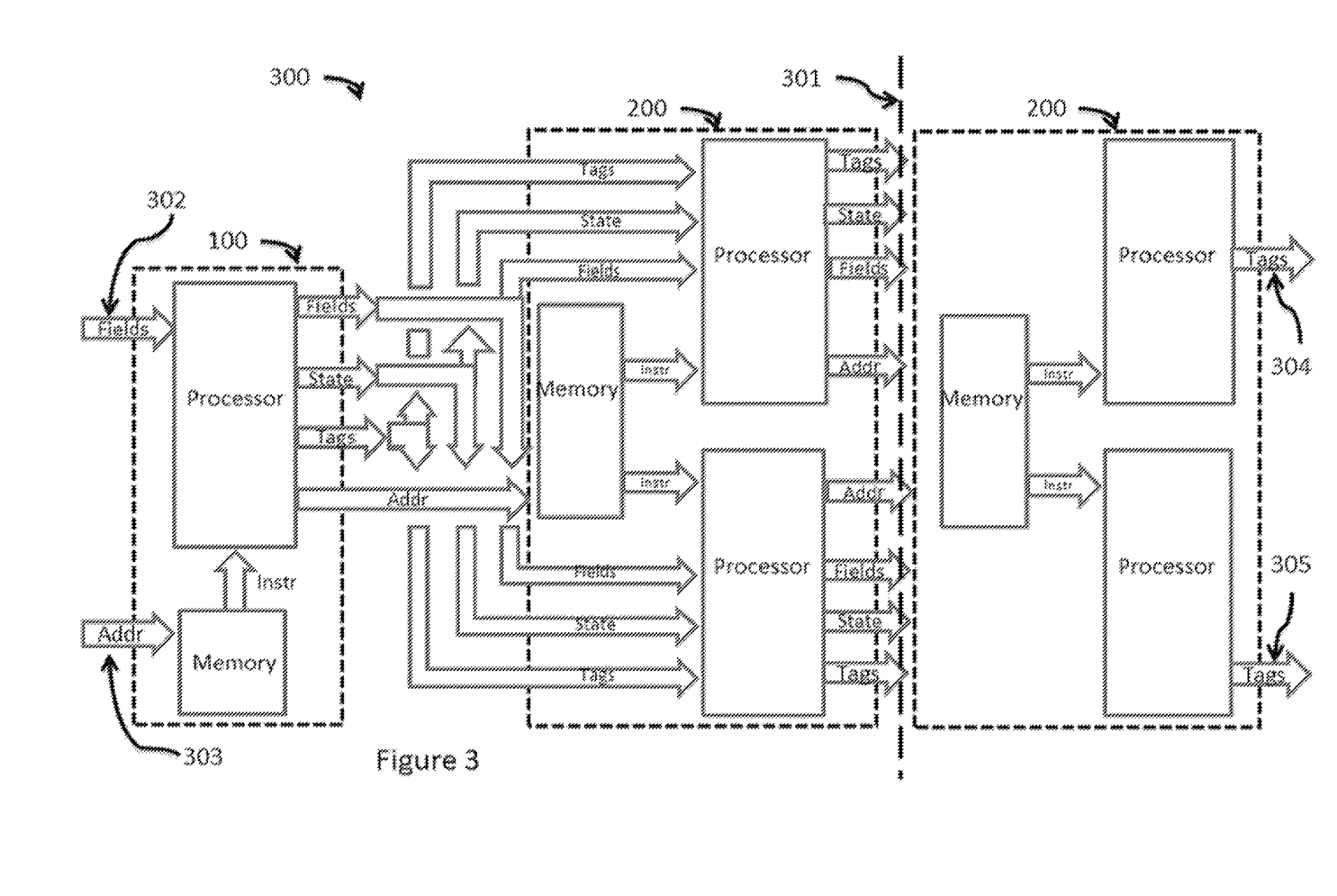
FIG. 3 depicts processing elements that may be pipelined as part of the technology disclosed herein.

According to the present technology, Processor Groups 200 may be pipelined according to FIG. 3. Each Processor Group 200 is thus connected to a next Processor Group 200, in a Processing Pipeline 300, until an incoming packet is classified, ie Tags 304, 305 are output as a result of processing respectively Fields 302, 303. This is a logical view, and therefore the number of connected Processor Groups 200 in the Processing Pipeline 300 may vary as represented by the line 301. The number is adapted to the characteristics of a decision tree as explained below. The architecture of Processor Group 200 enables two concurrent processing pipelines to run in Processing Pipeline 300. This is merely given as an example and the teachings of the present technology equally apply to more than two concurrent processing pipelines. The architecture of Processor Group 200 further enables processing one packet field per processing cycle.

A first stage of the Processing Pipeline 300 is represented as a single PE 100 in which are input Fields 302 and Address 303. The Memory in each of the PE 100 and the Processor Groups 200 allows decision tree configuration and corresponding Instructions to the Processor. The size of the Memory determines the width of the decision tree, while the number of pipelined PEs 100 determines the depth of the decision tree. Each PE 100 corresponds to a node in a decision tree built according to the following description.

Decision Tree Building

Figure 4:
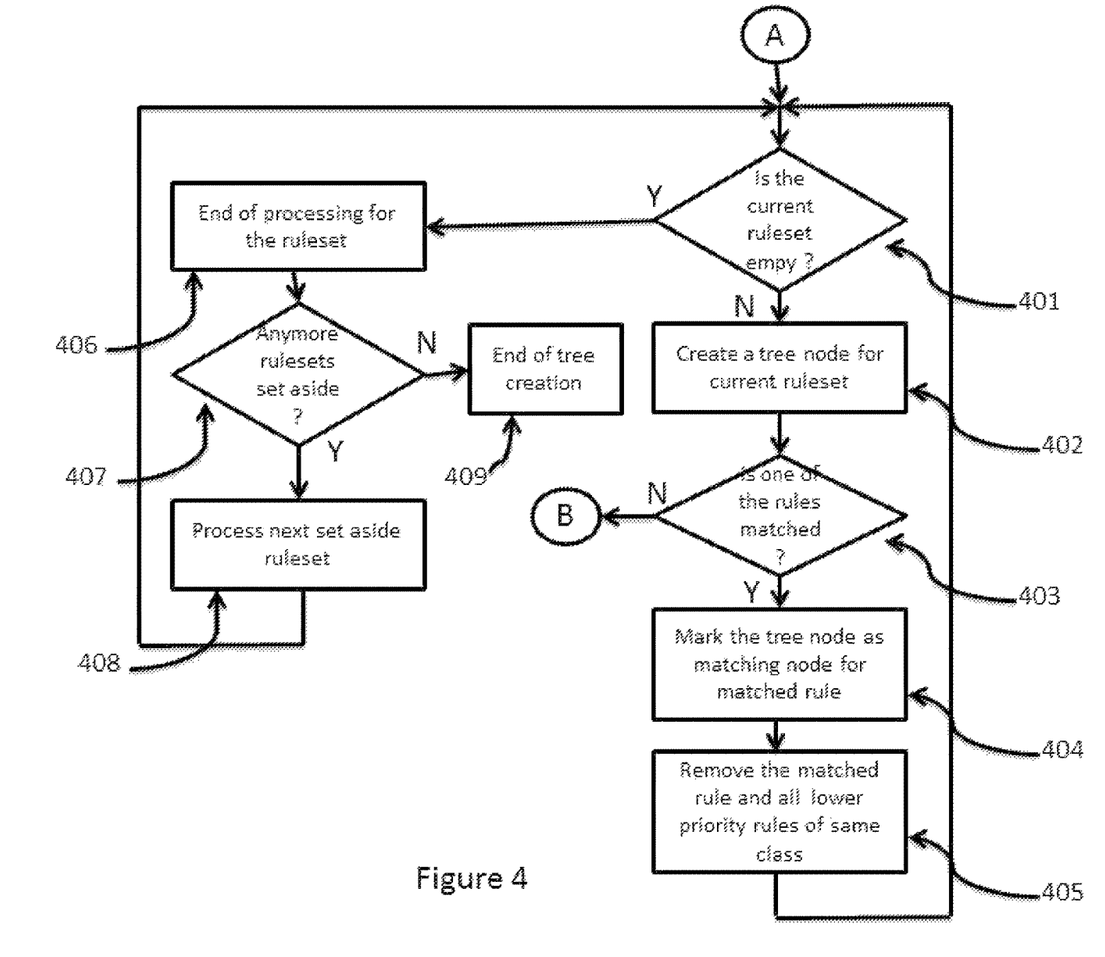
FIG. 4 and FIG. 5 combined depict a recursive algorithm to build a decision tree according to the present technology.
Figure 5:
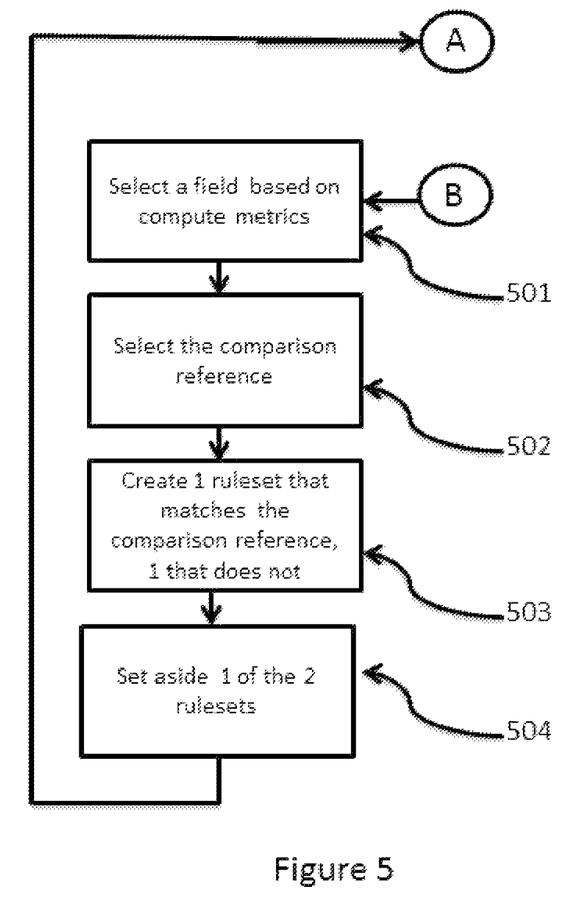

The building of a decision tree according to the present technology is depicted FIG. 4 and FIG. 5, as a two-part representation of a recursive algorithm to build a decision tree according to the present technology. At step 401, a check is made whether the current ruleset, ie a set of rules to be involved in the classifying of fields of a data packet, is empty. The initial ruleset may be established by the operator of the classifying activity, for example the operator of a networking piece of equipment implementing data packet classification for ensuring/improving Internet security. Assuming the current ruleset is not empty, at step 402 a tree node is created for the ruleset. Each node thus created is either a decision node to branch to children in the tree, or a labelling node that associates a Tag to a data packet field. At step 403 a check is made whether one of the rules in the ruleset is matched. If so, at step 404, the tree node created at step 402 is marked as a matching node for the matched rule. At step 405 the ruleset is purged of the thus matched rule and all lower priority rules in the same class. Hence a ruleset may not get larger, only smaller, and a loop back to step 401 is operated to check recursively whether the ruleset is empty.

If at step 403, none of the rules in the ruleset are matched, then at step 501 a data packet field is selected based on compute metrics. Such metrics may for example, as is known to the person skilled in the art, be based on information gain metrics, or field entropy, with a goal of efficiently restraining degrees of freedom, etc. At step 502, a comparison reference is selected, for example 0/1 for binary values, or minimum/maximum for ranges of values. At step 503, two rulesets are created, one that matches the comparison reference selected at step 502, and one that does not. At step 504, one of the two rulesets thus created is set aside for subsequent processing. The ruleset that is not set aside is the current ruleset that is checked recursively at step 401.

If at step 401, the current ruleset is empty, at step 406, this is the end of the processing for such ruleset. At step 407 is checked whether there are any remaining rulesets previously set aside at step 504. If there are none, the tree creation process is ended at step 409. If there are, the next ruleset set aside is processed at step 408 and becomes the current ruleset that is being checked recursively at step 401.

Figure 8:
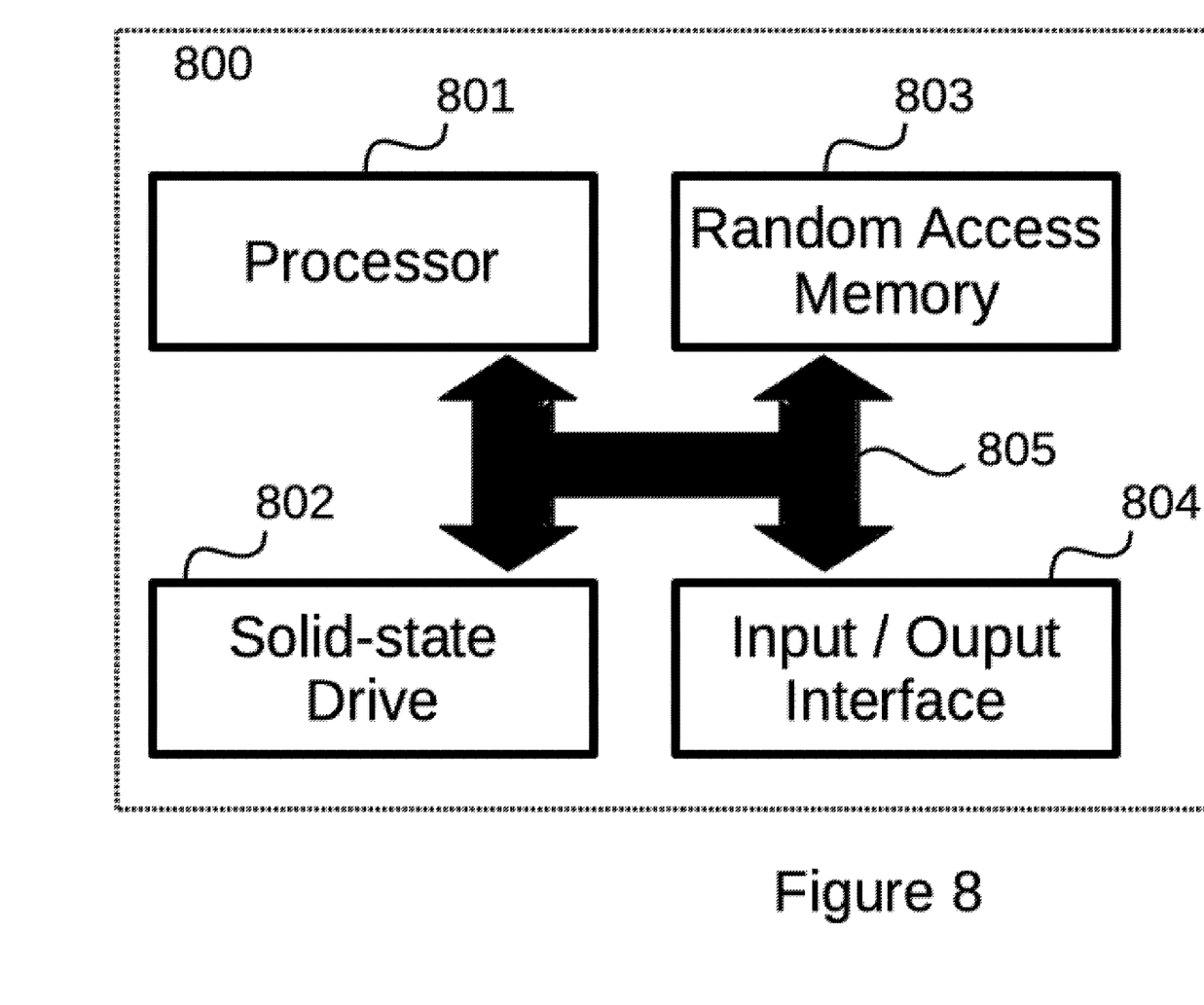
FIG. 8 depicts a computing system that may be used to implement the recursive algorithm toward decision tree building according to the present technology.

The decision tree building process described above in relation to FIGS. 4-5, may be implemented in a separate computing system, of which an example, without limitation, may be found in relation to FIG. 8. As will be appreciated by the person skilled in the art, such computing system may be implemented in any other suitable hardware, software, and/or firmware, or a combination thereof, and may be a single physical entity, or several separate physical entities with a distributed functionality.

In some aspects of the present technology, the computing system 800 may comprise various hardware components including one or more single or multi-core processors collectively represented by a processor 801 (not necessarily on a FPGA), a solid-state drive 802, a random access memory 803 and an input/output interface 804. In this context, the processor 801 may or may not be included in a FPGA. In some aspects, the computing system 800 may also be a sub-system of one of the above-listed systems. In some other aspects, the computing system 800 may be an "off the shelf" generic computing system. In some aspects, the computing system 800 may also be distributed amongst multiple systems. The computing system 800 may also be specifically dedicated to the implementation of the present technology. As a person in the art of the present technology may appreciate, multiple variations as to how the computing system 800 is implemented may be envisioned without departing from the scope of the present technology.

Communication between the various components of the computing system 800 may be enabled by one or more internal and/or external buses 805 (e.g. a PCI bus, universal serial bus, IEEE 1394 "Firewire" bus, SCSI bus, Serial-ATA bus, ARINC bus, etc.), to which the various hardware components are electronically coupled.

The input/output interface 804 may allow enabling networking capabilities such as wire or wireless access. As an example, the input/output interface 804 may comprise a networking interface such as, but not limited to, a network port, a network socket, a network interface controller and the like. Multiple examples of how the networking interface may be implemented will become apparent to the person skilled in the art of the present technology. According to implementations of the present technology, the solid-state drive 802 stores program instructions, such as those part of, for example, a library, an application, etc. suitable for being loaded into the random access memory 803 and executed by the processor 801 for the process steps according to the present technology.

To each node created in the built decision tree, is mapped a PE 100 as per FIGS. 1-3. The architecture described above of combination of decision tree building, with specific hardware configuration, allows to elaborate complex decision trees, and even forests, through the programmability of PEs and Processor Groups, and the ability to have more than two parallel and concurrent pipelined Processor Groups. The implementation of Processor Groups 200 allows to efficiently either process a data packet field through concurrent decision trees, or have a single decision tree be applied to two data packets, doubling the maximum throughput.

The versatility of the PEs makes it possible to build and implement any decision tree, without having to adapt the implementation, as is otherwise required if the PEs were specialized elements. This architecture further allows a decision tree building to be optimized in terms of compromise between processing speed (ie: one packet field per processing cycle), and the maximum number of classifying rules that may be handled (ie: several tens of thousands of rules depending on actual FPGA used) without constraints on the number of classes that may be handled.

Tags are stored in the tree: this (1) allows to avoid the recourse to a memory outside of the FPGA and thus to avoid serious speed limitations owing to transfer speeds between the FPGA and any such external memory, and (2) enables to process data packet fields with multiple tags. Storing tags in the tree is made possible by the specific PE architecture pursuant to the present technology. A tree built in accordance with the present technology is autonomous in the sense that once fields of a data packet go through the classifying decision, no other operations are required and all classes in which such fields may be classified are known.

Example of Application of the Present Technology

The following is a simplified example of the building of a decision tree using the processing elements on a FPGA according to the invention. It will be assumed that the classification involves four rules and two groups of two classes applied on a field of an incoming packet frame as follows:

| Rule | IPv6 Source Address Field Value | Class |
| --- | --- | --- |
| 1 | fd00::1/128 | 1: Drop frame |
| 2 | fd00::0/16 | 1: Pass through frame |
| 3 | 2001::1/128 | 2: Threshold 0 |
| 4 | ::/0 | 2: Threshold 1 |

Rule 1 is looking at 128 bits in the IPv6 Source Address Field Value, associating to a $1^{st}$ class a tag of "Drop" if the value matches fd00 ::1/128, or binary representation 1111 1101 0000 0000 . . . 1.

Rule 2 is looking at 16 bits in the IPv6 Source Address Field Value, associating to the $1^{st}$ class a tag of "Pass through" if the value matches binary representation 1111 1101 0000 0000.

Rule 3 is looking at 128 bits in the IPv6 Source Address Field Value, associating to a $2^{nd}$ class a tag in relation to a "Threshold" of 0 if the value matches binary representation 0010 0000 0000 0001 . . . 1.

Rule 4 associates to the $2^{nd}$ class a tag in relation to a "Threshold" of 1 for all values.

Figure 6:
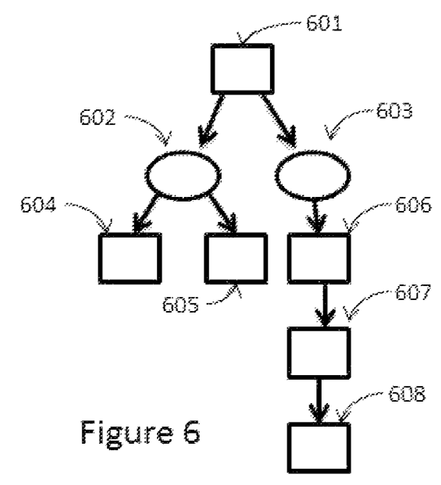
FIG. 6 illustrates an application of the present technology to build a decision tree with an example of field, rule and class values.

Applying the tree building algorithm according to FIG. 4 and FIG. 5, is obtained according to the present technology the decision tree as depicted FIG. 6. Node 601 is the starting point of the tree. If the first higher bit of the field value is 0, at node 602, rules 3 and 4 may be matched, while if the first higher bit of the field value is 1, at node 603, rules 1, 2 and 4 may be matched. From node 602, rule 4 is matched at final node 605, while if the field value is 2001::1/128, then rule 3 is matched at node 604. From node 603, rule 4 is matched at final node 606, rule 2 is matched if the sixteen higher bits of the field value match fd00 at node 607, and rule 1 is matched if at node 608, the sixteen higher bits of the field value match fd00, and the 112 remaining bits of the field value match 0000::1.

Figure 7:
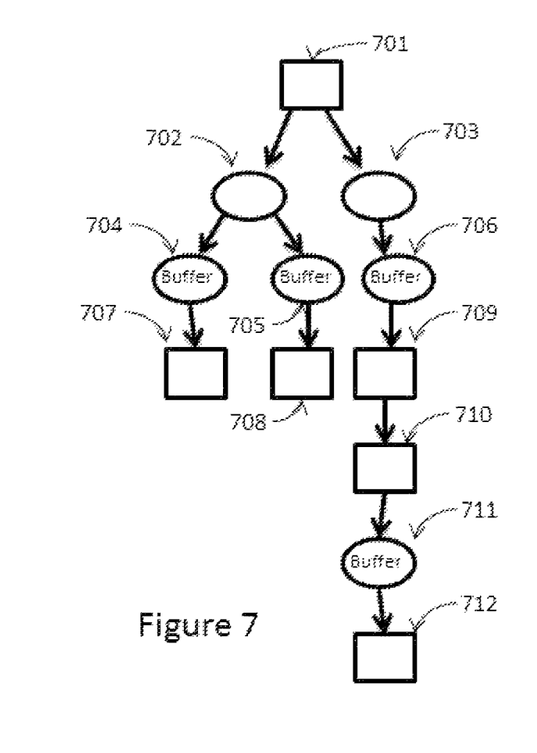
FIG. 7 illustrates an application of the present technology to build a decision tree with an example of field, rule and class values, and particular FPGA characteristics.

The tree obtained may be adapted to the FPGA hardware architecture of FIG. 1 to FIG. 3, resulting in the tree as depicted FIG. 7. In this example, without limitation, it is further assumed that FPGA memories may only handle 64-bit words when the field value that is being classified is 128-bit long. Buffer states 704, 705, 706 and 711 are being introduced that are used to process field values whose number of bits exceeds the capacity of FPGA memories. Node 701 is the starting point of the tree. If the first higher bit of the field value is 0, at node 702, rules 3 and 4 may be matched, while if the first higher bit of the field value is 1, at node 703, rules 1, 2 and 4 may be matched. From node 702, rule 4 is matched at final node 708 with the intermediate buffer state 705; while if the field value is 2001::1/128, then rule 3 is matched at final node 707 with the intermediate buffer 704. From node 703, rule 4 is matched at final node 709, with the intermediate buffer 706, rule 2 is matched if the sixteen higher bits of the field value match fd00 at node 710, and rule 1 is matched if at node 712, the sixteen higher bits of the field value match fd00, and the 112 remaining bits of the field value match 0000::1, with the intermediate note 711 for handling 64 bits out of the 112, then the remaining 48 bits.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for classifying data packet fields by associating a final tag to each of the fields in a data packet in relation to a set of classifying rules, comprising:
building a decision tree to apply the set of classifying rules on the data packet fields;
mapping each node of the built decision tree respectively to a processing element of a FPGA, each processing element comprising a processor and a memory;
pipelining all mapped processing elements so that each mapped processing element, but the first and last processing element in the pipeline, as current processing element:
receives as inputs, values: for the data packet fields, for a state of processing the data packet fields by the preceding processing elements in the pipeline, for tags associated with the data packet fields by the preceding processing elements in the pipeline, and for an address in the memory where the processor of the current processing element may fetch instructions to execute; and outputs values: for the data packet fields, for a state of processing the data packet fields by the preceding and current processing elements in the pipeline, for tags associated with the data packet fields by the preceding and current processing elements in the pipeline, and for an address in the memory where the processor of the next processing element in the pipeline may fetch instructions to execute;

processing the data packet fields through the pipelined and mapped processing elements by:

inputting in the first processing element in the pipeline values: for the data packet fields and for an address in the memory where the processor of the first processing element in the pipeline may fetch instructions to execute; and outputting by the last processing element in the pipeline values for the final tag associated with each of the data packet fields by the preceding and last processing elements in the pipeline.

2. The method of claim 1 in which the building a decision tree comprises introducing buffer states if the size of a data packet field to be matched with a classifying rule is larger than the size of the memory.

3. The method of claim 1 in which the building a decision tree comprises storing tags in the decision tree.

4. A system for classifying a first data packet comprising at least one field by associating a final tag to a first data packet field in relation to a first set of classifying rules, the system comprising pipelined processing elements on a FPGA, with each processing element comprising a processor and a memory, wherein the pipelined processing elements are each mapped respectively to a node of a first decision tree built to apply the first set of classifying rules on the first data packet field, and wherein each of the pipelined processing elements but the first and last processing elements in the pipeline, as current processing element:

receives as inputs, values: for the first data packet field, for a state of processing the first data packet field by the preceding processing elements in the pipeline, for tags associated with the first data packet field by the preceding processing elements in the pipeline, and for an address in the memory where the processor of the current processing element may fetch instructions to execute; and outputs values: for the first data packet field, for a state of processing the first data packet field by the preceding and current processing elements in the pipeline, for tags associated with the first data packet field by the preceding and current processing elements in the pipeline, and for an address in the memory where the processor of the next processing element in the pipeline may fetch instructions to execute;

and wherein the first processing element in the pipeline is configured to receive values: for the first data packet field and for an address in the memory where the processor of the first processing element in the pipeline may fetch instructions to execute;

and wherein the last processing element in the pipeline is configured to output values for the final tag associated with the first data packet field by the preceding and last processing elements in the pipeline.

5. The system of claim 4 in which the pipelined processing elements on the FPGA, but the first element in the pipeline, comprise at least two processors and a memory shared between the at least two processors, wherein one of the at least two processors is mapped to a node of a second decision tree built concurrent with the first decision tree to apply the first set of classifying rules on the first data packet field.

6. The system of claim 4 in which the pipelined processing elements on the FPGA, but the first element in the pipeline, comprise at least two processors and a memory shared between the at least two processors, wherein one of the at least two processors is mapped to a node of a second decision tree built to apply the first set of classifying rules or a second set of classifying rules on a second data packet.

7. The system of claim 4 in which the instructions to be executed by a processing element allow the processing element to perform at least one of the operations of:
comparing with a reference value;
updating the tags associated with each of the data packet fields;
ending processing;
duplicating the processing of data packet fields so as to process them through two or more decision trees; or
merging the processing of data packet fields at the end of two or more decision trees.

8. The system of claim 5 in which the instructions to be executed by a processing element allow the processing element to perform including the operation of parallel processing over two or more processors for instructions with operands that are larger than the memory capacity.

9. A method of building a first decision tree for classifying data packet fields by associating a final tag to each of the fields in a data packet in relation to a set of classifying rules, in a computing environment comprising:

processing elements of a FPGA, each processing element comprising a processor and a memory;

the processing elements being pipelined so that each processing element, but the first and last processing element in the pipeline, as current processing element:

receives as inputs, values: for the data packet fields, for a state of processing the data packet fields by the preceding processing elements in the pipeline, for current tags associated with the data packet fields by the preceding processing elements in the pipeline, and for an address in the memory where the processor of the current processing element may fetch instructions to execute; and outputs values: for the data packet fields, for a state of processing the data packet fields by the preceding and current processing elements in the pipeline, for current tags associated with the data packet fields by the preceding and current processing elements in the pipeline, and for an address in the memory where the processor of the next processing element in the pipeline may fetch instructions to execute; and the associating a final tag comprising:

inputting in the first processing element in the pipeline values: for the data packet fields and for an address in the memory where the processor of the first processing element in the pipeline may fetch instructions to execute; and outputting by the last processing element in the pipeline values for the final tag associated with each of the data packet fields by the preceding and last processing elements in the pipeline;
wherein the instructions allow the processing elements to perform one of:
comparing data packet fields with a reference value;
updating the current tags associated with the data packet fields;
duplicating the processing of data packet fields so as to process them through at least one second decision tree;
merging the processing of data packet fields that have been processed through the at least second decision tree; or
ending the comparing, updating, duplicating or merging;
and wherein the first decision tree is being recursively built by:
creating a tree node for the set of classifying rules, the tree node being either a decision node to branch to children in the first decision tree, or a labelling node that associates current tags to the data packet fields;
mapping the created tree node to a processing element;
marking the created node as matching node if one of the classifying rules in the set is matched; and
repeating the creating, mapping and marking for all classifying rules in the set until the set is empty.

10. The method of claim 9, comprising introducing buffer states if the size of a data packet field to be matched with a classifying rule is larger than the size of the memory.

11. The method of claim 9, comprising storing the current and final tags in the decision tree.

12. A system for classifying first data packet fields by associating a final tag to each of the fields in a data packet in relation to a set of classifying rules, the system comprising pipelined processing elements on a FPGA, with each processing element comprising a processor and a memory, and a computing system configured to build a first decision tree,
wherein the processing elements are pipelined so that each of the pipelined processing elements but the first and last processing elements in the pipeline, as current processing element:
receives as inputs, values: for the first data packet fields, for a state of processing the first data packet fields by the preceding processing elements in the pipeline, for current tags associated with the first data packet fields by the preceding processing elements in the pipeline, and for an address in the memory where the processor of the current processing element may fetch instructions to execute; and
outputs values: for the first data packet fields, for a state of processing the first data packet fields by the preceding and current processing elements in the pipeline, for current tags associated with the first data packet fields by the preceding and current processing elements in the pipeline, and for an address in the memory where the processor of the next processing element in the pipeline may fetch instructions to execute;
and wherein the associating a final tag comprises:
the first processing element in the pipeline being configured to receive values: for the first data packet fields and for an address in the memory where the processor of the first processing element in the pipeline may fetch instructions to execute; and
the last processing element in the pipeline being configured to output values for the final tag associated with the first data packet fields by the preceding and last processing elements in the pipeline;
wherein:
the instructions allow the processing elements to perform one of:
comparing the first data packet fields with a reference value;
updating the current tags associated with the first data packet fields;
duplicating the processing of the first data packet fields so as to process them through at least one second decision tree;
merging the processing of the first data packet fields that have been processed through the at least one second decision tree; or
ending the comparing, updating, duplicating or merging; and
the computing system is configured to build the first decision tree recursively by:
creating a tree node for the set of classifying rules, the tree node being either a decision node to branch to children in the first decision tree, or a labelling node that associates current tags or a final tag to the first data packet fields;
mapping the created tree node to a processing element;
marking the created node as matching node if one of the classifying rules in the set is matched; and
repeating the creating, mapping and marking for all classifying rules in the set until the set is empty.

13. The system of claim 12, in which the pipelined processing elements on the FPGA, but the first element in the pipeline, comprise at least two processors and a memory shared between the at least two processors, wherein one of the at least two processors is mapped to a node of a second decision tree built concurrent with the first decision tree to apply the set of classifying rules on the first data packet fields.

14. The system of claim 12, in which the pipelined processing elements on the FPGA, but the first element in the pipeline, comprise at least two processors and a memory shared between the at least two processors, wherein one of the at least two processors is mapped to a node of a second decision tree built to apply the set of classifying rules or a second set of classifying rules on second data packet fields.

15. The system of claim 13, in which the instructions to be executed by a processing element allow the processing element to perform including the operation of parallel processing over two or more processors for instructions with operands that are larger than the memory capacity.

* * * * *